(12) United States Patent
Chen

(10) Patent No.: US 7,394,567 B2
(45) Date of Patent: Jul. 1, 2008

(54) DATA EMBEDDING SCHEME FOR DUPLEX COLOR LASER PRINTER

(75) Inventor: Jau-Yuen Chen, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 665 days.

(21) Appl. No.: 10/970,568

(22) Filed: Oct. 21, 2004

(65) Prior Publication Data

US 2006/0088185 A1 Apr. 27, 2006

(51) Int. Cl.
G06K 15/00 (2006.01)
G06K 9/00 (2006.01)
H04N 1/40 (2006.01)

(52) U.S. Cl. .................. 358/1.9; 358/3.28; 358/3.3; 382/100; 382/103; 382/112; 382/232

(58) Field of Classification Search .............. 358/1.9, 358/1.15, 3.28, 3.3; 382/162–167, 135, 232, 382/305–306, 243–250, 100, 103, 112; 400/76; 713/175–176
See application file for complete search history.

(56) References Cited

U.S. PATENT DOCUMENTS

| 5,416,311 | A | 5/1995 | Kyriazis | |
|---|---|---|---|---|
| 5,946,414 | A | 8/1999 | Cass et al. | |
| 6,128,411 | A | 10/2000 | Knox | |
| 6,354,630 | B1 | 3/2002 | Zhang et al. | |
| 6,600,571 | B1 * | 7/2003 | Ito | 358/1.15 |
| 6,608,911 | B2 * | 8/2003 | Lofgren et al. | 382/100 |
| 6,636,616 | B1 | 10/2003 | Harrington | |
| 6,694,041 | B1 | 2/2004 | Brunk | |
| 6,731,776 | B1 * | 5/2004 | Fujiwara | 382/100 |
| 6,883,982 | B2 * | 4/2005 | Tokuda et al. | 400/76 |
| 7,006,256 | B2 * | 2/2006 | Wang et al. | 358/3.28 |
| 7,054,461 | B2 * | 5/2006 | Zeller et al. | 382/100 |
| 2003/0053654 | A1 | 3/2003 | Patterson et al. | |

FOREIGN PATENT DOCUMENTS

| EP | 0 606 021 | 7/1994 |
|---|---|---|
| JP | 2002-79708 | 3/2002 |

* cited by examiner

Primary Examiner—Edward Coles
Assistant Examiner—Charlotte M. Baker

(57) ABSTRACT

A data embedding technique that adds a watermark in the form of embedded data in the RGB domain in a duplex color laser printer. The data embedding algorithm employs a two-color (cyan and magenta) patch based coding scheme. Each bit of raw data is coded by a rectangular patch ("data area") of either cyan or magenta color surrounded by white space ("space area"). The combination of a single data area and corresponding space area is a "data cell".

10 Claims, 4 Drawing Sheets

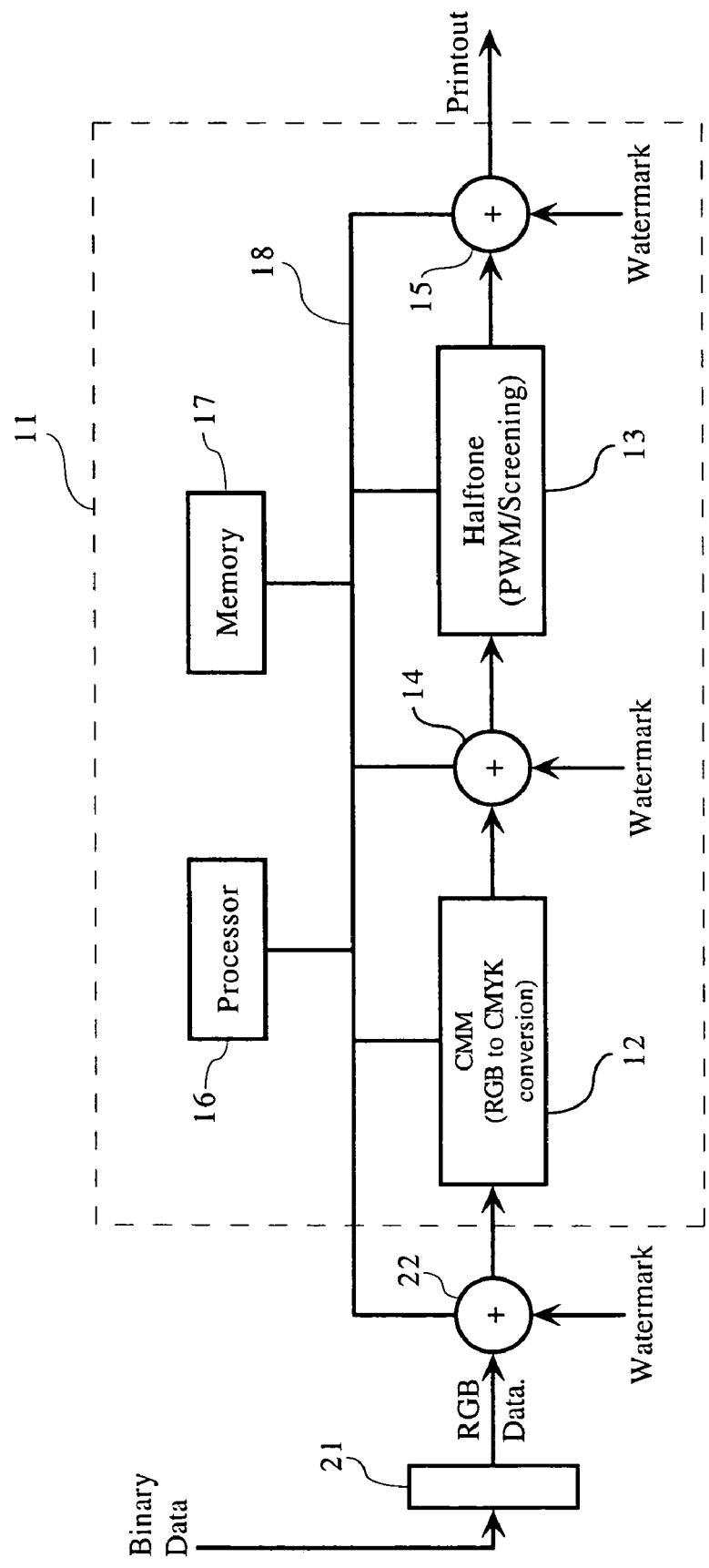

Page Layout	Data Block	Data Cell

75%　　　　50%　　　　25%

Page Layout   Translation and Rotation   Data Cell

DATA EMBEDDING SCHEME FOR DUPLEX COLOR LASER PRINTER

BACKGROUND OF THE INVENTION

1. Field of the Invention

This invention relates to data embedding and retrieval algorithms for a color laser printer, and more particularly to a multi-color patch based coding scheme. The invention can be embodied in a method, a program of instructions (e.g., software) and/or an apparatus.

2. Description of the Related Art

Conventionally, most printer-added watermarks have been inserted when the data is in the CMYK domain. ("CMYK" depicts a color space composed of cyan (C), magenta (M), yellow (Y) and black (K)). This is especially true for ink-jet printers in which the device driver has full access to the output dot pattern. However, for color laser printers, a CMYK-domain watermark requires direct access to the CMYK color space, which is deep inside the printer pipeline, as shown in FIG. 1.

For a duplex laser printer, it is not uncommon to apply tone reduction to reduce bleed-thru for plain paper printing. However, this step can adversely affect a watermark added at either the RGB domain or CMYK domain stage of the pipeline. Using tone reduction, even a saturated pixel might not appear on the printout after going through screening. This makes the adage "a dot is a dot" no longer true. On the other hand, if the embedded watermark data is to be printed on the backside of document, the bleed-thru problem must be overcome. An additional constraint to consider is that many laser printer engine manufactures put their own watermark on the Y channel.

OBJECTS AND SUMMARY OF THE INVENTION

Objects of the Invention

Accordingly, it an object of this invention to provide a data embedding algorithm that overcomes the problems of the prior art, taking the above-noted constraints into account.

It is another object of this invention to provide such a data embedding algorithm in the form of a two-color-patch-based coding scheme, with the two colors preferably being cyan and magenta.

Summary of the Invention

According to one aspect of this invention, a method for embedding data in a print medium is provided. The embedding method comprises the steps of: (a) obtaining first data in RGB domain representing matter to be printed on the print medium; (b) coding each digital element (e.g., a single bit) of second data to be embedded in the print medium with either a cyan or a magenta color patch that is surrounded by a data space to form a data cell; (c) grouping the data cells into one or more data blocks as needed, each data cell being included in one of the data blocks and each data block including a plurality of data cells; (d) grouping the data blocks into one or more layout areas as needed, each data block being included in one of the layout areas and each layout area containing a plurality of data blocks; and (e) embedding the second data on the print medium.

Preferably, the print medium is two-sided, and step (e) further comprises printing the to-be-printed matter on one side of the print medium, wherein the second data is embedded on the other side of the print medium. The second data is preferably embedded opposite light tone regions of the printed matter.

Preferably, the patch size of each data cell is based on a tone level of the to-be-printed matter.

In another aspect, the invention involves a method for retrieving data embedded in a print medium. The retrieving method comprises the steps of: converting a printed medium to digital data to recover a plurality data blocks, each of which includes a plurality of data cells, each of which contains either a cyan or a magenta color patch and a space area surrounding the data area; performing a block matching routine to find the best match location for each data block; and performing a code retrieval routine that extracts a digital element from each data cell. The code retrieval routine comprises calculating a cyan signal estimator and a magenta signal estimator for each data cell and comparing the cyan signal and magenta signal estimators for a particular cell to determine the particular digital element extracted from that cell.

Another aspect of the invention involves a printer having the capability to embed data into a print medium. The printer comprises a processor; memory in communication with the processor; and a watermark module configured to operate in cooperation with the processor and the memory to perform the embedding described above.

In accordance with further aspects of the invention, any of the above-described methods or steps thereof may be specified by a program of instructions (e.g., software), which may be stored on, or conveyed to, a computer or other processor-controlled device for execution thereof. Alternatively, the program of instructions may be embedded in hardware, or may be realized as a combination of software and hardware. A device-readable medium is defined as a computer readable medium in which software is encoded.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 shows a laser printer processing pipeline;

FIG. 2 is a block diagram of a laser printer and its processing pipeline according to embodiments of the invention;

DESCRIPTION OF THE PREFERRED EMBODIMENTS

Figure 3:
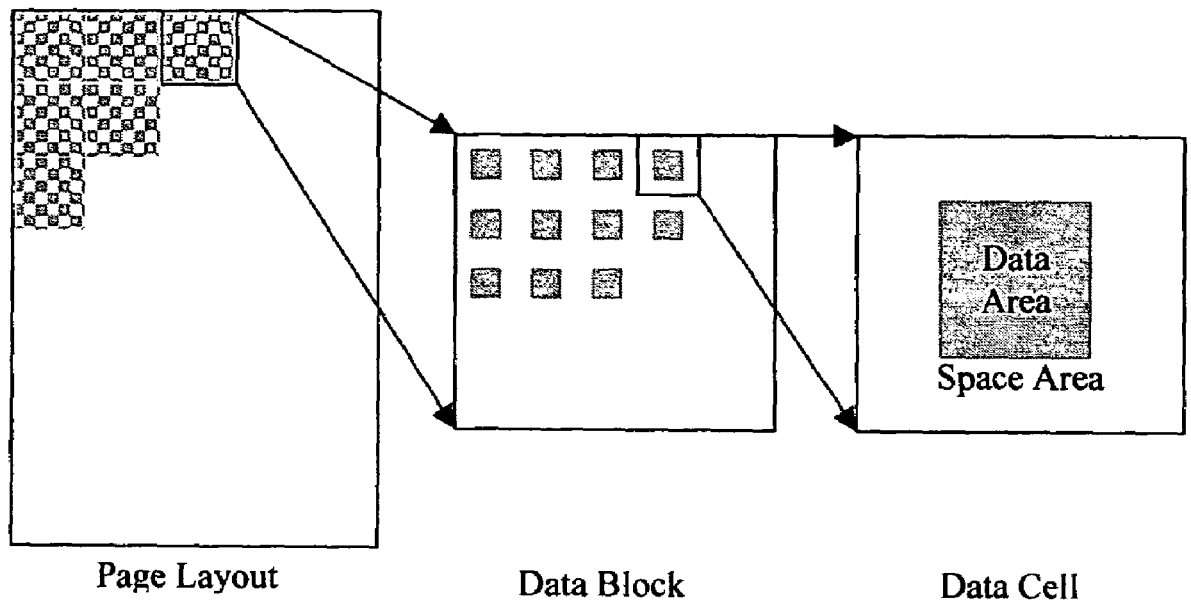
FIG. 3 is a diagram illustrating the coding hierarchy in accordance with embodiments of the invention.

Referring to FIG. 2, printing system 10 includes a printer 11, which is preferably a laser printer. Laser printer 11 includes a CMM module 12, which performs high performance 3D color matching management (CMM) including RGB to CMYK conversion. Laser printer 11 also includes halftone module 13, which performs halftone screening and pulse width modulation (PWM). Watermarking modules 14 and 15 are also positioned in the printer processing pipeline, one between the CMM and halftone modules and the other after the halftone module. Printer 11 also typically includes a processor 16 that provides computing resources and controls the printer in cooperation with an external host, if any. Processor 16 may be implemented with a microprocessor or the like. Printer 11 further includes memory 17 which may be in the form of random-access memory (RAM) and read-only memory (ROM). In the illustrated embodiment, all major system components connect to bus 18 which may represent more than one physical bus. Laser printer 11 typically includes other components as well, but as they are not directly pertinent to the invention, they are omitted so as not unnecessarily obscure the invention.

The printing system also includes a binary-to-RGB data converter 21 and an RGB domain watermark module 22 upstream of the print processing pipeline.

Embedding Algorithm

In the data embedding algorithm of this invention, which is designed primarily for a duplex color laser printer, binary data is first converted into RGB data which is then embedded with data, i.e., watermarked, in RGB watermark module 22 in accordance with the invention and fed into the printer pipeline. The basic watermarking algorithm employed by watermark module 22 is a two-color (cyan and magenta) patch based coding scheme. More specifically, each bit of raw data is coded by a rectangular patch of either cyan or magenta color surrounded by white space. The rectangular patch is referred to as a "data area", the space as a "space area", and the combination of the two areas as a "data cell," as shown in FIG. 3.

From experiment, it is known that both the printing process and scanning process will create non-uniform scaling distortion. In most cases, the combination of printer nonlinearity and scanner nonlinearity is less than 1%, which is assumed for purposes of this invention. To put that in perspective, one percent of a full page image on letter size paper scanned at 600 dpi is approximately 67 pixels, compensation for which ordinarily could be very difficult. However, to tolerate the scaling error, in accordance with the invention, a layer of block structure is added on top of the patch structure. More specifically, n×n data cells are grouped into a "data block." Each page, in turn, is composed of a plurality of data blocks, each of which contains a plurality of data cells, as shown in FIG. 3.

Figure 4:
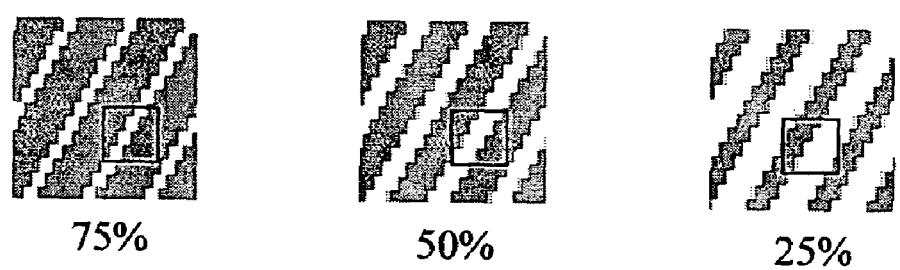
FIG. 4 shows an exemplary patch on different tone levels.

Preferably, this embedded data is printed on the back-side of document, in which steps are taken to ensure that this embedded data does not bleed-thru and disturb normal reading of the information printed on the front-side document. To avoid bleed-thru interference, the embedded data is located on light tone region. To further avoid bleed-thru, the data cell is not a solid patch of saturated color. As mentioned above, for a duplex color laser printer, it is not uncommon to apply tone reduction to reduce bleed-thru for plain paper printing. Using tone reduction, even a saturated pixel might not appear on the printout after going through screening. In any event, in the case of line screen, the screen frequency determines the minimal patch size, as illustrated in FIG. 4, which shows an exemplary patch on three different tone levels. By experiment, a minimal patch size of 5×5 has been selected.

Figure 5:
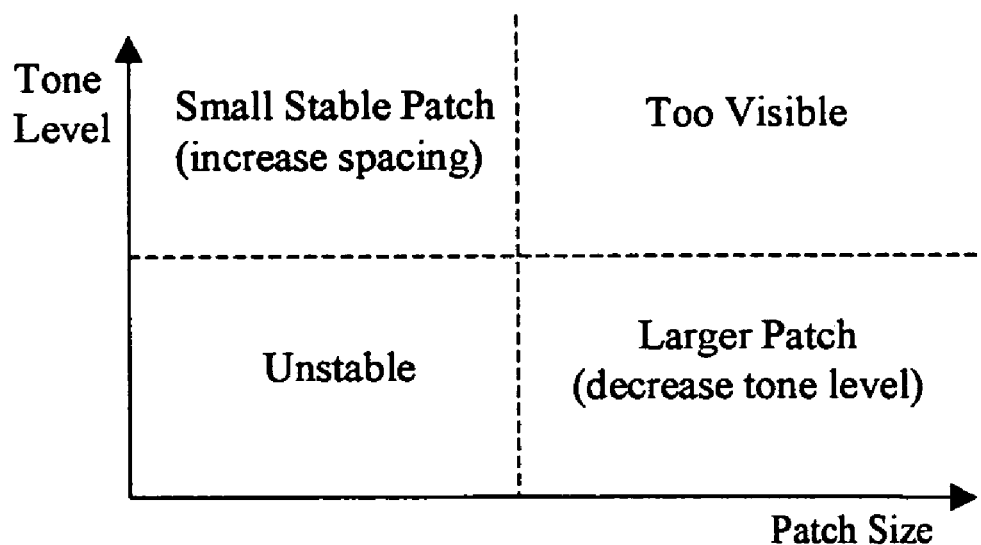
FIG. 5 is a graphical representation illustrating the relationship between tone level and patch size.
Figure 6:
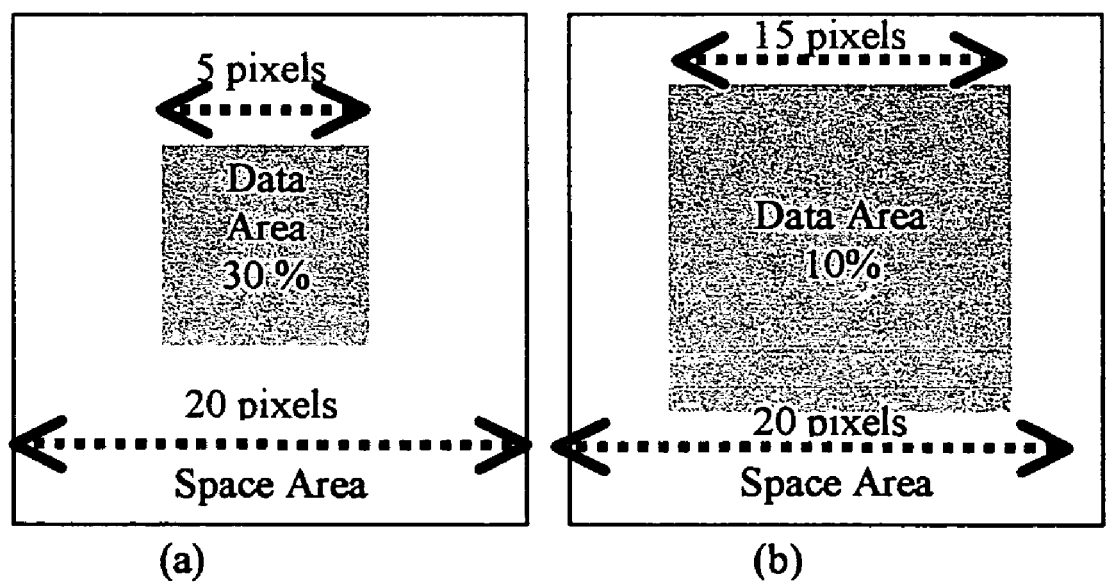
FIGS. 6 (*a*) and (*b*) show two exemplary data cell arrangements with different data area to space area ratios.

There are two parameters controlling the visibility of a watermark (i.e., the embedded data) and its bleed-thru. As illustrated in FIG. 5, either the space area can be increased while tone level is maintained, or the tone level can be decreased while the patch size is kept at or above the minimum. Very low tone level with a patch that is too small is to be avoided, as that condition results in an unstable watermark. In one embodiment that uses the minimal patch size, the spacing area is increased to reduce the visibility. In that embodiment, a 30% tone level is selected for coding a 5×5 pixel data area within a 20×20 pixel space area, as shown in FIG. 6(a). In another embodiment, the patch size (data area) can be increased to allow even lower tone level. In that embodiment, a 10% tone level is selected for coding a 15×15 pixel data area within a 20×20 pixel space area, as shown in FIG. 6(b).

Retrieval Algorithm

The algorithm to retrieve the coded data from a scanned RGB bitmap image comprises two basic steps: block matching to find the best match location for each block, and code retrieving to retrieve a single bit from each data cell. The block matching routine finds block locations by translating and rotating each block to maximize the number of cyan/magenta pixels inside each data area. The code retrieval routine estimates each of the cyan and magenta data signals by comparing the foreground signal which includes bleed-thru and the background (bleed-thru only) for each of the cyan and magenta channels.

Figure 7:
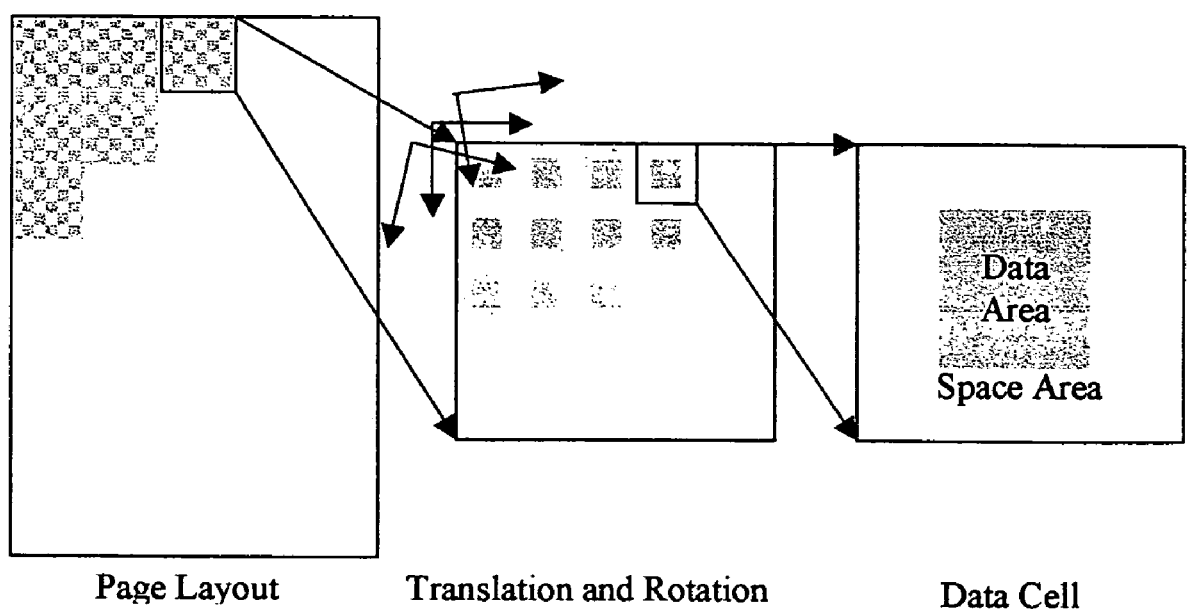
FIG. 7 is a diagram illustrating the block matching operation of the data retrieval algorithm according to embodiments of the invention.

The input of the retrieval algorithm is an RGB image scanned at 600 dpi. The working environment is assumed to be the usual office environment in which the rotation of the input data is less than 5 degrees and the translation of the input data is less than 2 inches. Under these assumptions, the block matching routine is used to find block locations by translating and rotating each block to find the best match location, as illustrated in FIG. 7.

The code retrieval routine retrieves a single bit from each data cell. The data is embedded on the back-side of a document. Depending on the content of the document, bleed-thru may occur; therefore, the retrieval algorithm takes that into account by assuming that the tone of any bleed-thru is constant in a given data cell. More specifically, the average tone of the space area in a single data cell, i.e., the background) is used to estimate the bleed-thru. The bleed-thru value for cyan is denoted $BG_{cyan}$ and the bleed-thru value for magenta is denoted $BG_{magenta}$. The foreground is assumed to additive in that it includes the bleed-thru. Therefore, the average tone of the data area in a single data cell is used to estimate the sum of the signal and bleed-thru. The cyan foreground signal plus the cyan bleed-thru is denoted $FG_{cyan}$, and the magenta foreground signal plus the magenta bleed-thru is denoted $FG_{magenta}$.

The code retrieval routine then estimates the embedded data signal for a particular cell by first calculating the cyan and magenta signal estimators for that cell ($X_{cyan}$ and $X_{magenta}$ respectively) in accordance with the following equations:

$$X_{Cyan} = \frac{(FG_{Cyan} - BG_{Cyan})}{BG_{Cyan}}$$

$$X_{Magenta} = \frac{(FG_{Magenta} - BG_{Magenta})}{BG_{Magenta}}$$

Note that in this example each of $X_{Cyan}$ and $X_{Magenta}$ is defined as the contrast ratio of the difference estimation and background estimation for that color. Using this ratio, the color reproduction problem can be significantly reduced. The two signal estimators are then compared to determine whether there is a 1 or a 0 in the particular cell. In one embodiment, the difference between $X_{Cyan}$ and $X_{Magenta}$, is used to compute which bit value (1 or 0) is in the cell. Thus, for a given decision threshold T, if $(X_{Cyan}/X_{Magenta})>T$, the bit is 1 (or 0), else
if $(X_{Magenta}/X_{Cyan})>T$, the bit is 0 (or 1), else
the bit in the cell is deemed corrupted by noise.

Instead of a ratio test, a distance test of the following form may be used.

if $|X_{Cyan}-X_{Magenta}|<T$, then the bit is declared corrupted, else
if $X_{Cyan}>X_{Magenta}$) then the bit is 1 (or 0), else
the bit is 0 (or 1).

By comparing signals at two color channels, the false positive frequency is decreased without increasing signal-noise ratio of an individual channel.

As the foregoing description demonstrates, the present invention provides a data embedding technique in which a watermark in the form of data cells is inserted into a printed document in the RGB domain. Adding the watermark at this stage, as opposed to the CMY(K) stage, is advantageous in that it is less intrusive to the overall printer pipeline design and the RGB domain watermark is less device-dependent. Moreover, the result can be moved to CMY(K) domain, if desired, without modification. Moreover, the individual data cells are advantageously designed and inserted on the printed medium in such a way as to limit bleed-thru, and even in the case where bleed-thru occurs, the invention is able to compensate for it. The data embedding technique of this invention is also advantageously designed to avoid interference with laser printers that add their own watermark on the yellow (Y) channel.

As will be understood from the foregoing description, the data embedding techniques of invention may be incorporated in a printer and in particular a color laser printers. As such, the embedding algorithm has been described and illustrated in connection with a color laser printer. However, the embedding algorithm is not limited to printers; it may be implemented with other devices capable of performing the necessary processing and then transmitting the watermarked data to a printer for printing. Moreover, the printer may be a multi-function device that also includes other capabilities, e.g., scanning, copying, etc. With these implementation alternatives in mind, it is to be understood that the block and flow diagram shows the performance of certain specified functions and relationships thereof. The boundaries of these functional blocks have been arbitrarily defined herein for convenience of description. Alternate boundaries may be defined, so long as the specified functions are performed and relationships therebetween are appropriately maintained. The diagrams and accompanying description provide the functional information one skilled in the art would require to fabricate circuits or to write software code to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for embedding data in a two-sided print medium, comprising the steps of:
   (a) obtaining first data in RGB domain representing matter to be printed on the print medium;
   (b) coding each digital element of second data to be embedded in the print medium with either a cyan or a magenta color patch that is surrounded by a data space to form a data cell;
   (c) grouping the data cells into one or more data blocks as needed, each data cell being included in one of the data blocks and each data block including a plurality of data cells;
   (d) grouping the data blocks into one or more layout areas as needed, each data block being included in one of the layout areas and each layout area containing a plurality of data blocks; and
   (e) embedding the first data onto a first side of the print medium and embedding the second data on a second side of the print medium, wherein the second data is preferentially embedded opposite light tone regions of the first data and is preferentially not embedded opposite dark tone regions of the first data.

2. The method of claim 1, wherein the patch size of each data cell is based on a tone level of the to-be-printed matter.

3. The method of claim 1, wherein each digital element is a single bit.

4. A method for retrieving data embedded in a print medium, comprising the steps of:
   (a) converting a printed medium to digital data to recover a plurality of data blocks, each of which includes a plurality of data cells, each of which contains either a cyan or a magenta color patch and a space area surrounding the data area;
   (b) performing a block matching routine to find the best match location for each data block; and
   (c) performing a code retrieval routine that extracts a digital element from each data cell, the code retrieval routine comprising calculating a cyan signal estimator and a magenta signal estimator for each data cell and comparing the cyan signal and magenta signal estimators for a particular cell to determine the particular digital element extracted from that cell.

5. A printer having the capability to embed data into a two-sided print medium, the printer comprising:
   a processor;
   memory in communication with the processor; and
   a watermark module configured to operate in cooperation with the processor and the memory to:
      receive first data in RGB domain representing matter to be printed on the print medium,
      code each digital element of second data to be embedded in the print medium with either a cyan or a magenta color patch that is surrounded by a data space to form a data cell,
      group the data cells into one or more data blocks as needed, each data cell being included in one of the data blocks and each data block including a plurality of data cells, and
      group the data blocks into one or more layout areas as needed, each data block being included in one of the layout areas and each layout area containing a plurality of data blocks; and
      embed the first data onto a first side of the print medium and embed the second data on a second side of the print medium, wherein the second data is preferentially embedded opposite light tone regions of the first data and is preferentially not embedded opposite dark tone regions of the first data.

6. The printer of claim 5, wherein the printer is a color laser printer.

7. A device-readable medium encoded with a program of instructions for causing a device to perform a method of retrieving data embedded in a print medium, the program of instructions comprising for:
   (a) instructions for converting a printed medium to digital data to recover a plurality of data blocks, each of which includes a plurality of data cells, each of which contains either a cyan or a magenta color patch and a space area surrounding the data area;
   (b) instructions for performing a block matching routine to find the best match location for each data block; and
   (c) instructions for performing a code retrieval routine that extracts a digital element from each data cell, the code retrieval routine comprising calculating a cyan signal estimator and a magenta signal estimator for each data cell and comparing the cyan signal and magenta signal estimators for a particular cell to determine the particular digital element extracted from that cell.

8. A device-readable medium encoded with a program of instructions for causing a device to perform a method of embedding data in a two-sided print medium, the program of instructions comprising:
   (a) instructions for receiving first data in RGB domain representing matter to be printed on the print medium;
   (b) instructions for coding each digital element of second data to be embedded in the print medium with either a cyan or a magenta color patch that is surrounded by a data space to form a data cell;
   (c) instructions for grouping the data cells into one or more data blocks as needed, each data cell being included in one of the data blocks and each data block including a plurality of data cells;
   (d) instructions for grouping the data blocks into one or more layout areas as needed, each data block being included in one of the layout areas and each layout area containing a plurality of data blocks; and
   (e) instructions for printing the to-be-printed matter on one side of the print medium and, embedding the second data on the other side of the print medium wherein the second data is preferentially embedded opposite light tone regions of the printed matter and is preferentially not embedded opposite dark tone regions of the printed matter.

9. The device-readable medium of claim 8, wherein the patch size of each data cell is based on a tone level of the to-be-printed matter.

10. The device-readable medium of claim 8, wherein each digital element is a single bit.

\* \* \* \* \*